US010992777B2

(12) United States Patent
Singhal et al.

(10) Patent No.: US 10,992,777 B2
(45) Date of Patent: Apr. 27, 2021

(54) SYSTEM AND METHOD FOR IDENTIFYING OTT APPLICATIONS AND SERVICES

(71) Applicant: NetScout Systems, Inc, Westford, MA (US)

(72) Inventors: Anil K. Singhal, Carlisle, MA (US); Narendra Byrapuram, Westford, MA (US); Rajeev Nadkarni, Chelmsford, MA (US); Mahesh Srinivasagowda, Acton, MA (US); Nilesh Tayade, Pune (IN); Anthony Peter Joch, Waterloo (CA)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 16/905,628

(22) Filed: Jun. 18, 2020

(65) Prior Publication Data

US 2021/0014328 A1 Jan. 14, 2021

Related U.S. Application Data

(60) Provisional application No. 62/863,692, filed on Jun. 19, 2019.

(51) Int. Cl.
*H04L 29/08* (2006.01)
*H04L 29/12* (2006.01)
*H04L 29/06* (2006.01)

(52) U.S. Cl.
CPC .......... *H04L 67/32* (2013.01); *H04L 61/1511* (2013.01); *H04L 61/2007* (2013.01);
(Continued)

(58) Field of Classification Search
CPC . H04L 67/32; H04L 61/1511; H04L 61/2007; H04L 63/0823; H04L 63/166;
(Continued)

(56) References Cited

U.S. PATENT DOCUMENTS

| 7,020,700 | B1* | 3/2006 | Bennett | H04L 63/0281 |
| | | | | 709/223 |
| 2011/0078278 | A1* | 3/2011 | Cui | H04L 61/3045 |
| | | | | 709/217 |

(Continued)

OTHER PUBLICATIONS

Extended European Search Report for European Patent Application No. EP20181261.7, dated Nov. 25, 2020.

*Primary Examiner* — El Hadji M Sall
(74) *Attorney, Agent, or Firm* — Locke Lord LLP; Scott D. Wofsy; Christopher J. Capelli (57) ABSTRACT

A computer implemented method for determining the identity of an Over-the Top (OTT) application or service being accessed over the Internet from a HTTP, HTTPS or QUIC connection request received in a network monitoring device. Determine if one or more entries are present in the received connection request have an IP address that matches a known server IP address. A determination is then made as to whether if the received connection request is one of a HTTP, HTTPS or QUIC connection request, and if this cannot be determined than determine if a subject field in the received connection request is available. And determine if a candidate domain name is available from IP cache created from one or more of the above steps if a subject field is not available in the received connection request. Identify and categorize OTT applications associated with the received connection request if it is determined: the connection is either a HTTP, HTTPS or QUIC connection type; a subject field is available; or a candidate domain name is available utilizing a lookup table that is periodically updated with new OTT applications.

18 Claims, 5 Drawing Sheets

(52) U.S. Cl.
CPC ........ *H04L 63/0823* (2013.01); *H04L 63/166* (2013.01); *H04L 65/60* (2013.01); *H04L 67/02* (2013.01); *H04L 69/16* (2013.01); *H04L 61/6009* (2013.01)

(58) Field of Classification Search
CPC ......... H04L 65/60; H04L 67/02; H04L 69/16; H04L 61/6009; H04L 43/026; H04L 41/147; H04L 43/062
See application file for complete search history.

(56) References Cited

U.S. PATENT DOCUMENTS

| | | | |
|---|---|---|---|
| 2014/0280764 A1* | 9/2014 | Dasher | H04L 65/4084 709/219 |
| 2015/0046568 A1* | 2/2015 | Mantin | H04L 65/605 709/219 |
| 2016/0028607 A1 | 1/2016 | Weill et al. | |
| 2017/0302703 A1 | 10/2017 | Buruganahalli et al. | |
| 2019/0149445 A1* | 5/2019 | Kelley, Jr. | H04L 43/08 709/224 |
| 2019/0190886 A1* | 6/2019 | Panje | H04L 67/02 |
| 2019/0319858 A1* | 10/2019 | Das | H04L 43/08 |

* cited by examiner

SYSTEM AND METHOD FOR IDENTIFYING OTT APPLICATIONS AND SERVICES

CROSS REFERENCE TO RELATED APPLICATIONS

This application claims priority to U.S. Patent Application Ser. No. 62/863,692 filed Jun. 19, 2019 which is incorporated herein by reference in its entirety.

FIELD OF THE INVENTION

The disclosed embodiments generally relates to monitoring data packets transmitted over a network, and more specifically to automatically identifying and categorizing applications and services.

BACKGROUND OF THE INVENTION

Over-the-top (OTT) services are generally characterized by the fact that the service or application is not provided by the carriers providing the Internet connection between the client and the server. Video streaming services, such as Netflix and YouTube, social media services, such as Facebook and Instagram, and on-line gaming applications are all examples of currently used OTT services. Internet Service Providers (ISPs) and other carriers who provide Internet transport services are often interested in understanding how their links are being used (e.g., for facilitating identification of new or emerging usage patterns that may require increased transport capacity).

Software-as-a-Service (SaaS) applications are a category of OTT services. Many enterprise businesses have an information technology (IT) organization responsible for the provision of services and applications. IT organizations are increasingly outsourcing the provision of standard business processes to third-parties who provide applications as OTT services. For instance, one of the most commonly used SaaS services is Microsoft's Office 365 (O365), which provides applications such as e-mail and shared file systems. The O365 applications are hosted on resources owned and managed by Microsoft, not the enterprise IT organization, and are accessed by users in the enterprise over the Internet.

Subscriptions to SaaS applications typically represent a significant cost for enterprises, and enterprises therefore typically desire to know if the SaaS services they pay for are being used, how much they are being used, and if they are being used by the intended users. This information ensures that: (a) the expected return on investment (ROI) of using SaaS services is being realized; (b) unauthorized use of services can be detected; (c) the future usage of Internet connections can be predicted as the use of SaaS services changes over time.

It is common for OTT and SaaS services to be provided over the hyper-text transport protocol (HTTP). The service may be accessed using an Internet browser or a dedicated application (a browser application will be used in this description for ease of description purposes). HTTP requests include a string identifying the resource being requested from the remote server called the "universal resource identifier" or URI. The header in HTTP requests also includes a "Host" field that identifies the domain name of the OTT or SaaS application being accessed. For an enterprise, analysis that includes the Host, URI and other HTTP request header fields can be used to determine which SaaS applications are being used, who is using them, the quantity of data being exchanged in each direction, and the number of individual transactions. This analysis can be performed by inspecting the contents of the Internet protocol (IP) packets carrying the HTTP request at the locations where the enterprise is connected to an Internet service provider. This is typically more efficient than trying to collect the information from individual users' computers or mobile devices; moreover, unauthorized users on the network may not have the necessary software installed to determine their Internet usage. An ISP or carrier interested in categorizing traffic is unlikely to have access to the user's computer or mobile device at all, typically making network analysis the only viable option.

It is to be appreciated that OTT and SaaS traffic flows over the public Internet, and hence the transport layer security (TLS) protocol is increasingly being used to encrypt HTTP connections between the Internet browser in the enterprise and the remote data centers hosting OTT and SaaS applications. HTTP traffic encrypted using TLS is called HTTPS. For enterprises to maintain visibility of how their SaaS service subscriptions are being utilized and for ISPs and carriers to understand their future capacity demands, a method of identifying which HTTP applications are being accessed is needed that works for both unencrypted HTTP and encrypted HTTPS traffic.

It is to be appreciated that similar requirement exists where an enterprise desires to use network analysis to understand the usage of an HTTP or HTTPS application that the enterprise hosts itself, for example in a physical data center, a co-location facility or a public cloud instance. Likewise, enterprises may desire to use network analysis to understand Quick UDP Internet Connections (QUIC), which currently is an emerging encrypted transport layer network protocol developed by Google configured to optimize connection-oriented web applications currently using TCP.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a combination of packet analysis techniques are employed to determine the identity of an application or service being accessed over the Internet. Particular analysis methods used for a given connection depend on the protocols in use. As described below, first and second methods are preferably consecutively employed to minimize the overall processing required.

The first method of identifying the service or application is to determine if the destination IP address of the connection can be directly mapped to a domain name. This check can be performed on the SYN packet of the TCP handshake. First, the destination IP address is compared with entries in a cache of IP address/domain name mapping pairs. Thus, the IP address of the destination server in the TCP SYN packet can be compared with the contents of the cache, and, if there is a domain name entry with a matching IP address, it is stored as a candidate domain name.

If there is no match in the IP cache, then in a second step, the destination IP address is compared with a list of IP address ranges registered in the public IP address space. It is to be appreciated that Public IP address ranges are managed and allocated by five International Regional Internet Registries (RIRs). For instance, IP addresses in North America are managed by the American Registry for Internet Numbers (ARM). Each RIR typically publishes a database listing which organizations own different IP address ranges on the public Internet. This list can be preferably uploaded to the network monitoring tool and subsequently updated as appropriate. This enables connections to be mapped to the parent domain of the registered owner of the IP address space matching the TCP SYN packet.

It is to be appreciated that two methods are preferably employed to update the IP cache. The first method is to inspect domain name system (DNS) queries between browsers and their designated DNS servers. The Host field in HTTP and HTTPS requests can be an IP address, but is likely to be a domain name. In this scenario, the browser preferably performs a DNS name-resolution query to obtain an IP address for the target HTTP/HTTPS server. The DNS server preferably provides a response to the browser containing the domain name being queried and one or more IP addresses associated with the domain name. According to an illustrated embodiment, DNS name-resolution responses visible to the monitoring function are inspected and are used to add IP address/domain name mapping pairs to the IP cache. The second method is to use TLS handshake SNI entries to update the IP cache, as discussed below.

If the application is being provided over an unencrypted HTTP connection, then the HTTP Host, Referrer, URI and Content-Type fields can be extracted from the HTTP packet header. As noted above, the Host field can contain an IP address, but is likely to contain a fully qualified domain name (FQDN). For SaaS services, the domain name will typically contain the name of the SaaS or OTT service provider, e.g. "provider.com". Moreover, individual services or applications often have dedicated sub-domain names, e.g. "application1.provider.com". For internally hosted applications, the FQDN may contain a sub-domain registered under the organization's primary domain name, e.g. "application1.enterprise.com".

The domain name alone is often sufficient to identify the service or application in use. However, the URI can also be useful in identifying specific applications. The "Referrer" and "Content-Type" HTTP header fields may also be used in the identification of an application.

If encrypted HTTPS is in use, then the Server Name Indication (SNI) field in the TLS handshake can be used as a proxy for the HTTP Host field. This is because the SNI field contains the domain name of the service being requested. The SNI field allows multiple services with different domain names to be accessed via a shared IP address. For instance, a load balancer hosting a shared IP address can use the SNI field to direct HTTPS sessions to the server hosting the desired service. The SNI field is sent by the client to the server in the "ClientHello" message contained in the first packet of the TLS handshake. It is noted that the presence of the SNI field is mandatory in TLS 1.3, but is optional in older versions of TLS. If the SNI field is present, a corresponding IP address/domain name mapping pair is added to the IP cache. Similarly, if the QUIC protocol is being utilized, the aforesaid SNI field in the QUIC handshake may be used as a proxy. With regards to the QUIC scenario, it is to be understood that depending on the QUIC version, the ClientHello message may need to be decrypted using the Initial Secrets for the specific QUIC version in use.

If the SNI field is not populated in the TLS handshake, then the "Subject" or "Subject Alternate Name" fields in the TLS server certificate may be inspected. These fields contain complete or wild-carded domain names, e.g. "application1.company.com" or "*.company.com" that can be used to identify the service or application. Use of the certificate fields works in all versions of TLS prior to TLS 1.3 with the server certificate being encrypted in the TLS 1.3 handshake.

A final step is selection of an application or service name, e.g. "Provider A Spreadsheet", and a category such as "Business Application" for the HTTP/HTTPS connection being analyzed. This final step preferably utilizes the information obtained from the previous steps and a lookup table that is updated from time-to-time as new applications of interest are identified and added to the list.

BRIEF DESCRIPTION OF THE DRAWINGS

The accommpanying appendices and/or drawings illustrate various non limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
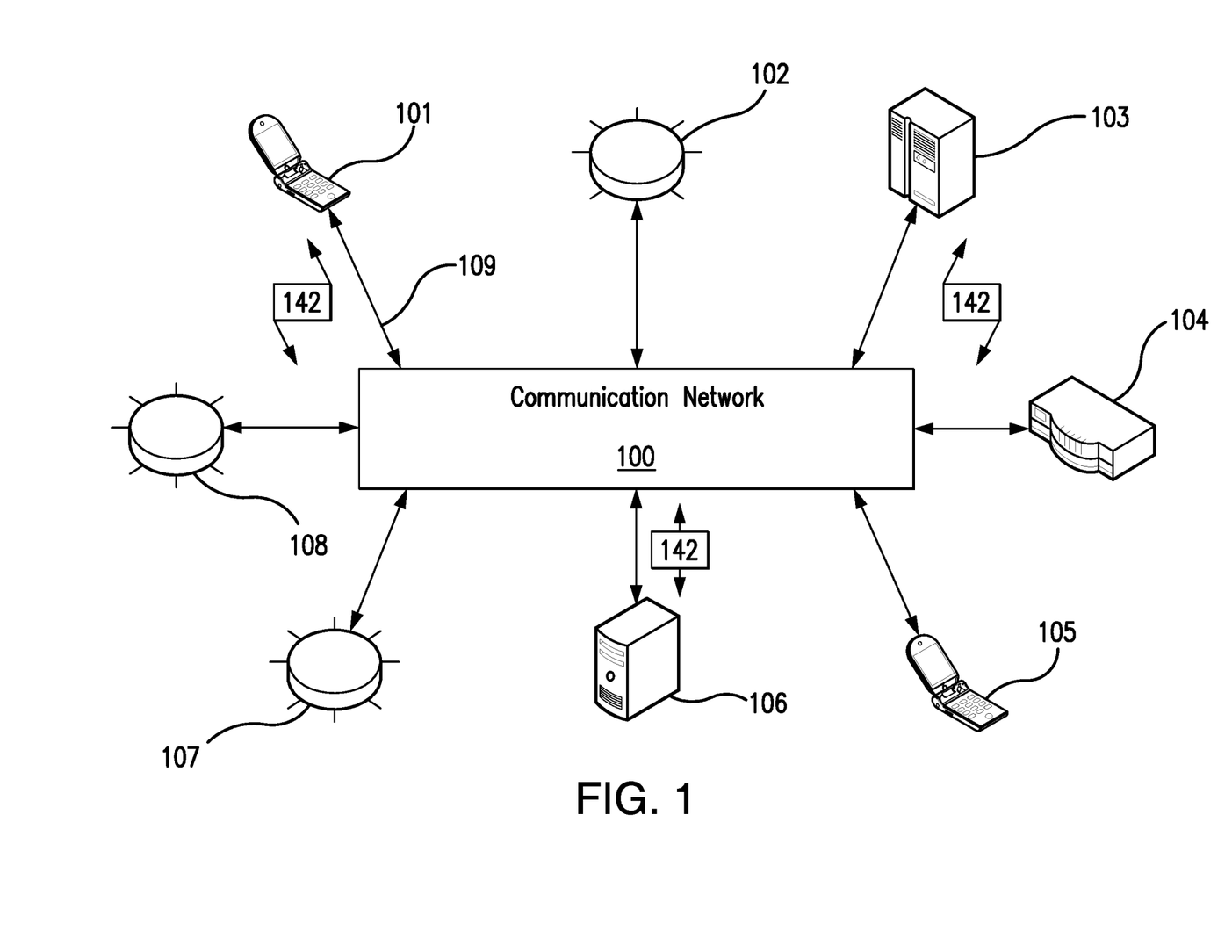
FIG. 1 illustrates an example communication network.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, packet analyzer device 104, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
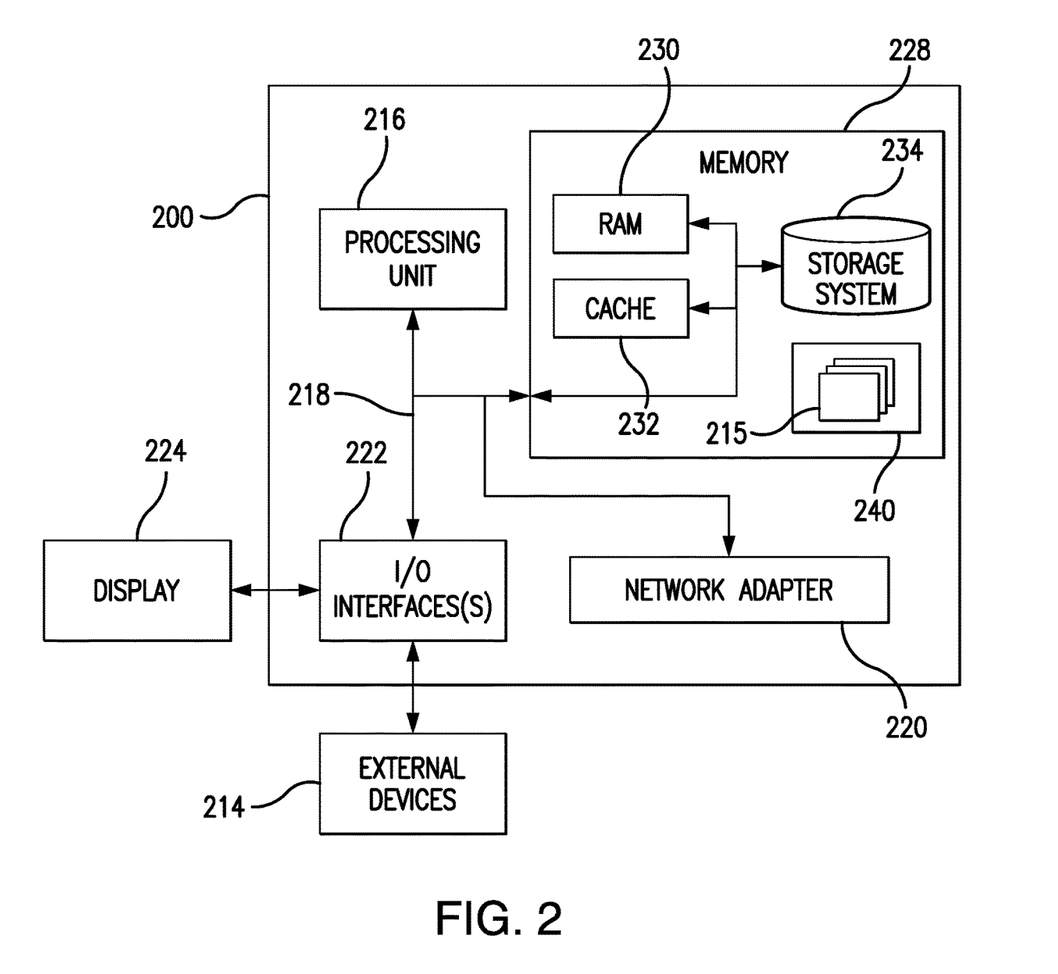
FIG. 2 illustrates an example network device/node coupled to the communication network of FIG. 1.

FIG. 2 is a schematic block diagram of an example network computing device 200 (e.g., client computing device 103, switching device 104, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
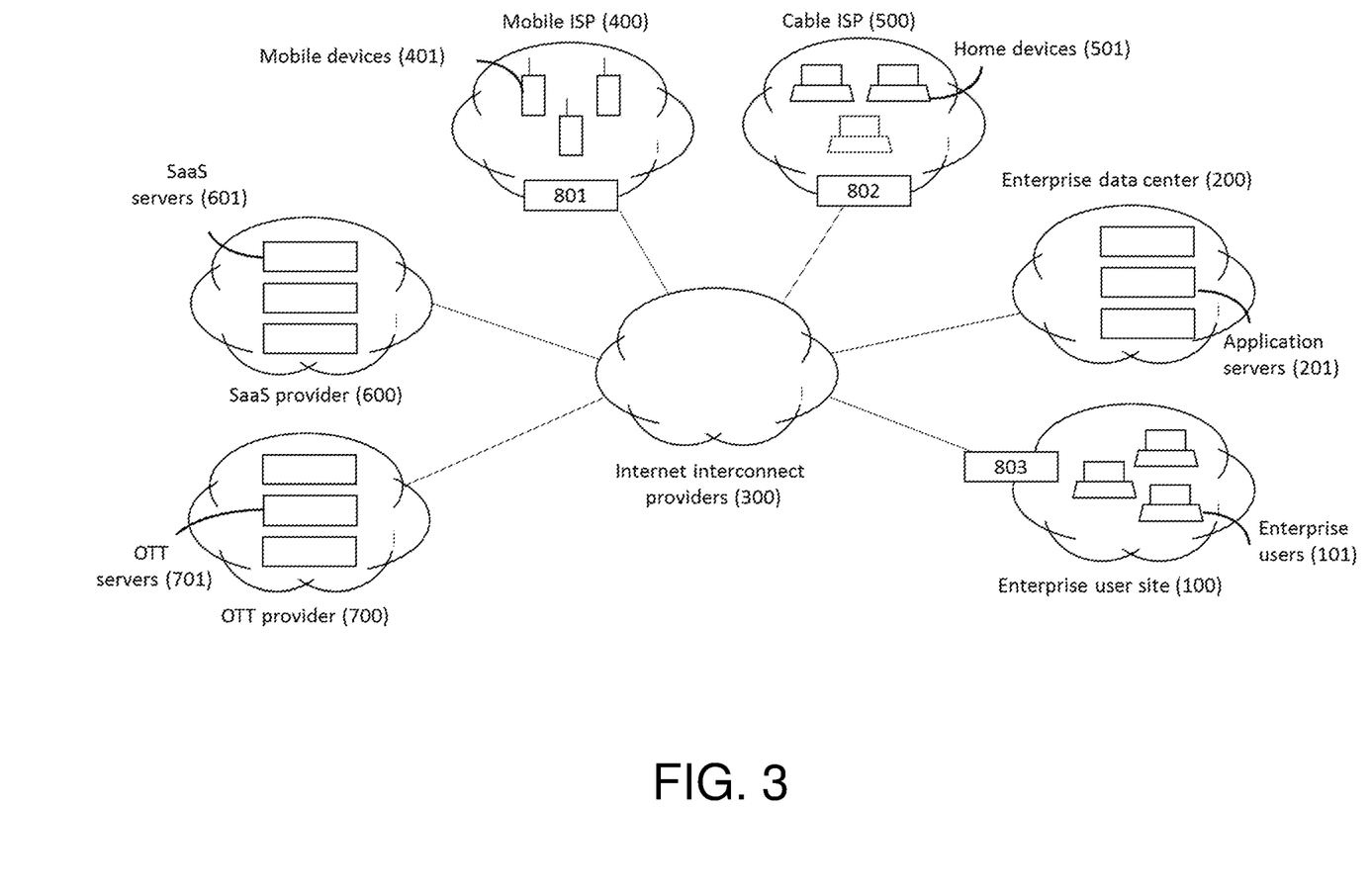
FIG. 3 illustrates an OTT application monitoring at ISP locations, SaaS monitoring at an enterprise user site and internal app monitoring in the enterprise data center utilizing one or more components of the network device of FIG. 2.

With the exemplary communication network 100 (FIG. 1) and computing device 200 (FIG. 2) being generally shown and discussed above, description of certain illustrated embodiments of the present disclosure will now be provided with reference to FIG. 3 illustrating a plurality of networks that are connected together via the Internet (300) using one or more components from the network and devices of FIGS. 1 and 2.

In an OTT example, an OTT provider 700 uses servers 701 in their data center to provide an OTT service such as video streaming. Typically, two groups of users access the OTT service over the Internet 300, namely, mobile device users 401 who are connected to a mobile ISP's network 400; home device users 501 who are connected to a cable ISP network 500. Network monitoring devices specifically configured to monitor network function instances are preferably located at a peering point 801, 802 between the mobile ISP network 400 and the Internet 300, and between the cable ISP network 500 and the Internet 300. The network monitoring devices 801, 802 preferably perform the application and service identification and categorization, as described below.

In the SaaS scenario, a SaaS service provider 600 uses servers 601 in their data center to provide a SaaS service such as a suite of business support applications. Users 101 located at an enterprise site 100 connect to the SaaS service via the Internet 300. A network monitoring device 802, 803 is preferably located at the peering point between the Enterprise site 100 and the Internet 300 and between the cable ISP network 500 and the Internet 300.

In the internal application scenario, the enterprise uses servers 201, in one of their data centers 200, typically provide applications for the enterprise users 101. The connection between the enterprise user site 100 and the enterprise data center 200 will typically be provided over a private wide area network (WAN), for example using MPLS circuits. The network device 803 preferably located at the edge of the enterprise user location 100 may view traffic flowing to both the SaaS applications and the internal applications.

For ease of description purposes, the network monitoring devices 801, 802 and 803, which preferably function in a similar manner, will hereafter be collectively referred to as network monitoring device 800. It is to be appreciated and understood the monitoring device 800 preferably passively receives copies of Internet protocol (IP) packets flowing on the network link being monitored for each respective monitoring device 801, 802 and 803. This may be achieved using a network tap or a switch port analysis (SPAN) port on a router or switch, which is not to be understood to be limited thereto.

Figure 4:
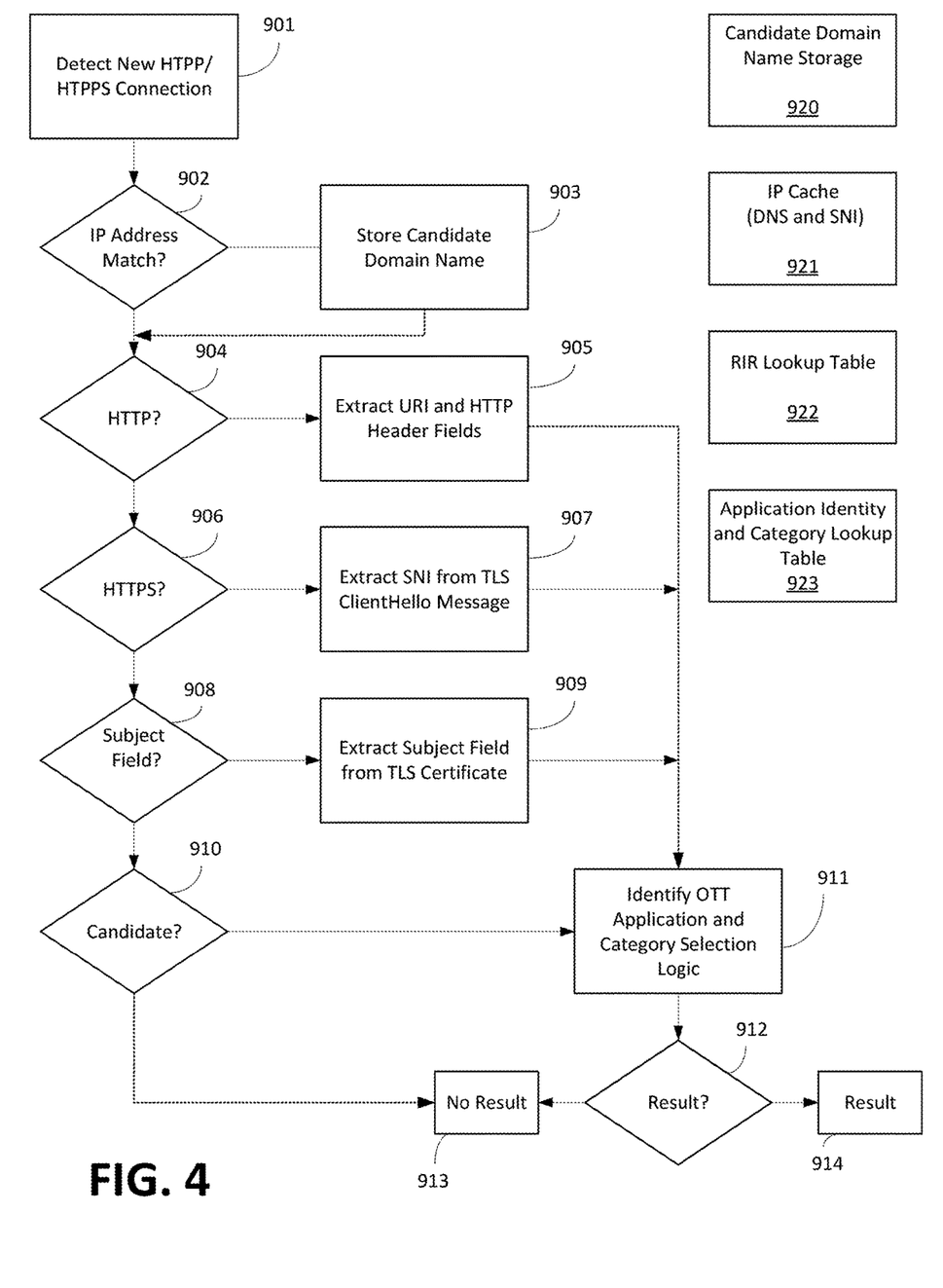
FIG. 4 illustrates a flow chart in accordance with an illustrated embodiment.

With reference now to FIG. 4 (and with continuing reference to FIG. 3), illustrated is a flow chart of the process 900 used to identify and categorize HTTP, HTTPS and QUIC connections established over the Internet or a private network in relation to the applications and services being accessed. With specific regards to QUIC connections, it is to be understood QUIC is currently an alternative protocol to HTTP/HTTPS connections. QUIC runs over UDP (e.g., on port 443) instead of TCP used for HTTP/HTTPS connections. An advantage of a QUIC connection over that of an HTTPS connection is QUIC over UDP typically provides lower latency than HTTPS connections over TCP. With regards to application identification, QUIC traffic is similar to HTTPS traffic whereby information that identifies the application is the SNI, which is sent by the client to the server in the ClientHello message. And with regards to Google QUIC (GQUIC)connections, the SNI is visible in-the-clear in the ClientHello message. In IETF QUIC, the ClientHello message is encrypted using the "Initial" encryption context. It is to be understood these messages may be decrypted by an in-network monitoring device since the key values are derived from a connection ID that is visible in the QUIC long headers at the start of a connection between client and server, and a version-specific constant, which can be obtained from the implementation of each version of IETF QUIC.

It is to be understood for ease of description purposes, the illustrated embodiments described herein are to be described with reference to HTTP/HTTPS connections, however they are not to be understood to be limited thereto as it may similarly be utilized with QUIC connections (see for instance below step 906 in FIG. 4). It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

The process 900 in FIG. 4 preferably starts when a new HTTP or HTTPS connection is detected by a network monitoring device 800, step 901. The network monitoring device 800 preferably inspects IP packets and creates a 5-tuple consisting of the IP source and destination addresses, the layer 4 transport protocol (e.g. TCP or UDP), and the transport protocol source and destination ports. The 5-tuple is preferably compared with entries in a connection table to determine if this is a new or existing connection. If there is no existing entry, then a new entry is created matching the 5-tuple of the received packet. If there is an existing entry, then the packet may or may not be processed depending on which step in the process is currently being executed. In an exemplary embodiment, 5-tuple entries are be removed from the connection table if no matching packets are seen after a pre-configured timeout period, e.g. 180 seconds.

It is to be appreciated that HTTP and HTTPS use the transport connection protocol (TCP) as their layer 4 transport protocol. The Internet assigned numbers authority (IANA) defines well-known or registered server ports for HTTP (80 and 8080) and HTTPS (443 and 8443) connections. However, it is also common for HTTP and HTTPS to be offered on non-standard ports, in which case these can be manually added to the list of known HTTP and HTTPS ports in the network monitoring function (800). It is noted that with regards to QUIC connections, port 443 is preferably utilized for QUIC over UDP.

When a new connection is detected, if the transport layer protocol is TCP and the destination TCP port matches one of the ports known to carry HTTP or HTTPS, then the packet is passed to Step 902 either by reference or by value. It is noted step 902 is preferably performed and inspects the destination IP address of the TCP SYN packet sent from the client to the server. The format of IP headers and TCP headers are described in RFCs 791 and 793 respectively. The destination IP address of the packet is first compared with a list of IP address/domain name mapping pairs stored in the IP cache (921). If one or more entries are found with IP addresses matching the server IP address, then the domain name is stored in the candidate domain name store (921).

After storing the candidate domain name (step 903), or if there is no match in the IP cache (step 902), then the process 900 continues to step 904 which compares the destination IP address of the TCP SYN packet with a lookup table of the IP address ranges (subnets) registered in the public IP address space (922). It is to be appreciated the RIR lookup table 922 is preferably built from databases published by the five Regional Internet Registries (RIRs), which table can be uploaded to the network monitoring tool and updated from time-to-time as required. If the destination IP address in the TCP SYN packet matches a public IP addresses range registered to an organization with a known parent domain name, then that name is stored in the candidate domain name store (920).

The IP cache (921) is preferably built dynamically in the network monitoring function (800) using two methods. The first method is to inspect the contents of responses to DNS queries that are viewed by the monitoring function. If the response contains a domain name in the query and one or more resource records (RR) with resolved IP address, then a new IP address/domain name mapping record is preferably added to the cache. If there are multiple IP addresses in the DNS response message, then in one embodiment only one IP address is added to the cache (e.g. the IP address in the last or first RR). In an alternative embodiment, all of the IP addresses in RRs are added to the cache. IP addresses may be IPv4 or IPv6 format as indicated in the RR.

It is noted the format of DNS messages is described in RFC 1035. RR entries contain a time-to-live (TTL) value, which indicates how long the result may be cached before it should be discarded. Advantageously, the TTL value can be converted to an expiry date and time and stored in corresponding IP address/domain name mapping entry. Thus, if an entry is matched but it has expired, it will be removed from the cache rather than being used.

The second method of updating the IP cache is to use TLS handshake SNI entries as described below. In all cases, a new IP address/domain name mapping pair entry is only added if it does not already exist in the cache. Advantageously, if the new DNS or SNI entry is a better match than the existing cache entry for the IP address (e.g., the domain name has more levels), then preferably the entry is updated with the more detailed domain name.

Regardless of whether a matching IP address was found in Step 902, the process continues with Step 904. If the connection TCP port matches a known HTTP port, then Step 905 identifies the URI, Host, Content-Type and Referer fields. Although there are multiple versions of the HTTP protocol, the fields referenced in this description are preferably available in all versions of HTTP. The URI and Host are present in the HTTP request header with the Referrer field being optional. Further, the Content-Type header field in the HTTP response header is used, as this indicates the media type of the response payload.

It is to be understood and appreciated that the first packet in a new HTTP connection will be a request packet sent from the client to the server, which preferably starts with a line in the following format: <method><uri>HTTP/<x.y>. Where <method> is the HTTP request type, e.g. GET, POST, PUT, DELETE, <uri> is the URI field and <x.y> is the HTTP version, e.g. 1.0 or 1.1.

The values of the HTTP request URI, Host and Referer fields and HTTP response Content-Type field are thereafter passed to Step 911 either by reference or by value.

The specifications for versions 1.0 and 1.1 of HTTP are described in RFCs 1945 and 2616, respectively. The following is an example of an HTTP 1.1 GET request header.
GET/app HTTP/1.1
Referer: http://othersite.com/app
Connection: Keep-Alive
User-Agent: Mozilla/3.01 (X11; I; SunOS 5.4 sun4m)
Host: application1.provider.com:80

If the connection TCP port does not match a known HTTP port at Step 904, then the connection is determined to be HTTPS and processing continues at Step 906.

It is to be understood and appreciated that the first packet of an HTTPS connection after the TCP handshake is typically the TLS handshake ClientHello message sent by the client to the server. The SNI field is an extension to the ClientHello message—its format is defined in RFC 3546. It is noted that inclusion of the SNI field is optional in versions 1.0 to 1.2 of TLS and is mandatory in version TLS 1.3. The HostName part of the SNI field is the FQDN of the target host, as described in RFC 3546. Hence, if an SNI extension is detected in the ClientHello in Step 906, then the HostName string is passed to Step 911 either by reference or by value. If there are multiple SNI entries, then in one illustrated embodiment, only the first or last entry is sent to Step 911. In an alternative embodiment, all of the SNI entries are sent to Step 911. If the SNI field is present, a corresponding IP address/domain name mapping pair is added to the IP cache (921), updating the previous entry if it is a better match as described above.

If no SNI field is detected at Step 906, then the "End Entity" X.509 format Server Certificate in the TLS handshake ServerHello message is inspected in Step 908. The ServerHello message is sent from the server to the client in response to the ClientHello message and hence will not be the first packet in the connection. The format of X.509 Certificates is defined in ITU-T Recommendation X.509 with the basic format used in TLS described in RFC 1422.

In an illustrated embodiment, the CN sub-field in the X.509 Subject field is passed to Step 911 either by reference or by value. In a second illustrated embodiment, one or more of the entries in the X.509 extension Subject Alternative Name field are passed to Step 911 either by reference or by value, which may be instead of or in addition to passing the Subject CN sub-field. If there are multiple entries in the Subject Alternative Name field, then in one illustrated embodiment, only the first entry is sent to Step 911. In an alternative embodiment, all of the entries are sent to Step 911.

In TLS 1.3, the server certificate is encrypted and hence the Subject field will not be available. Hence if the TLS 1.3 is in use or if the Subject field is missing or empty, then processing will continue at Step 910.

If processing has reached Step 910, i.e. the HTTP, SNI and Certificate methods have failed, but a candidate domain name is available from the IP cache, then processing continues at Step 911. If no candidate is available, then processing moves to Step 913 and the process terminates with no result.

Step 911 performs the selection logic used to determine the identity and category of the application or service associated with the HTTP/HTTPS connection. The following fields from Steps 905, 907 and 909 are all treated as domain names:
HTTP Host header
HTTP Referer header
TLS ClientHello SNI extension
TLS X.509 Certificate Subject CN field
TLS X.509 Certificate extension Subject Alternative entries
Domain names extracted from DNS response RR entries
If a domain name is available from one of Steps 905, 907 and 909 and there is also a domain name present in the domain name cache from Step 902, then the domain name with the most levels is selected as the target for the next phase of the search, for example "application1.provider.com" would be selected in preference to "provider.com".

Figure 5:
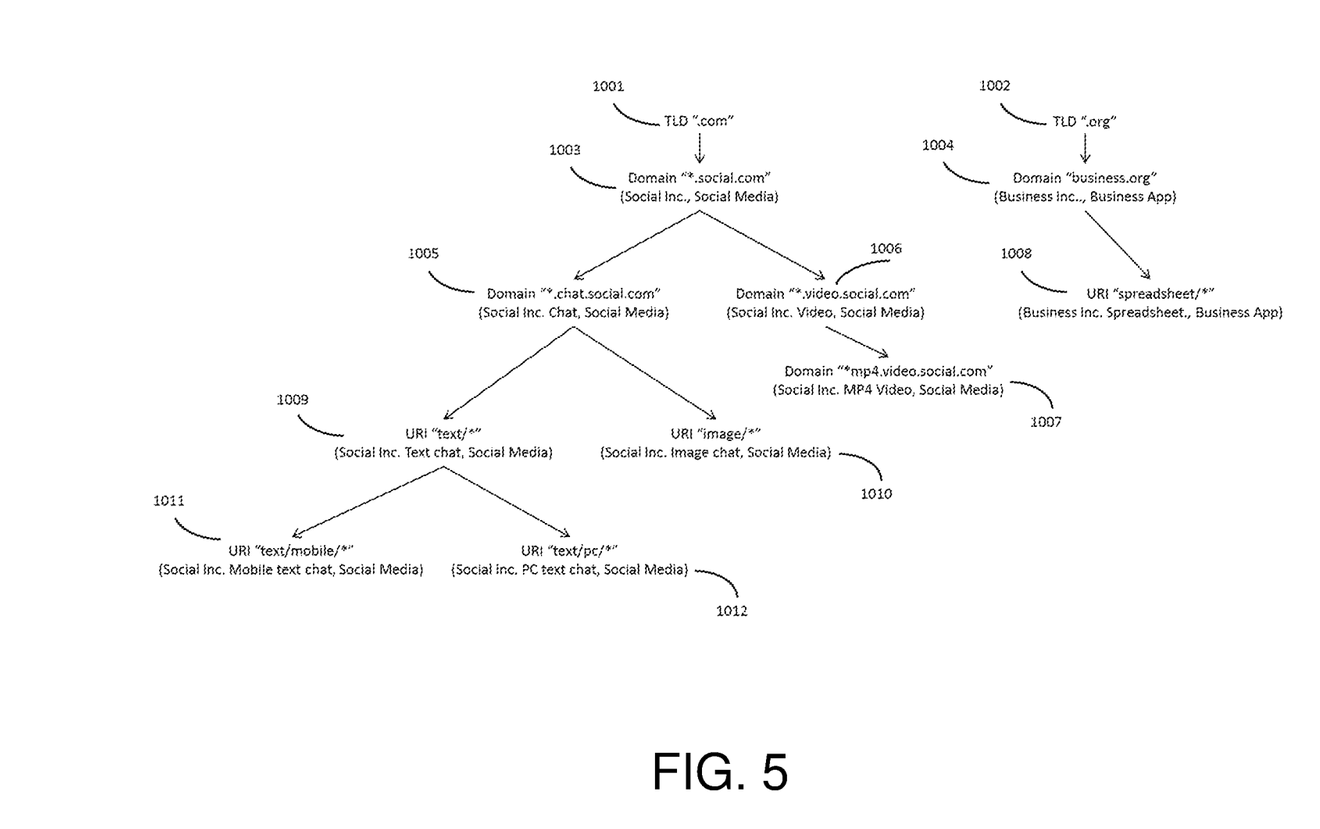
FIG. 5 illustrates an identification and categorization selection tree.

The application identity and category (AIC) lookup table is logically organized as a set of trees as shown in FIG. 5. The root of each tree (1001, 1002) represents a top-level domain (TLD) such as ".com", ".org" or a composite TLD such as ".co.uk". The next layers of child nodes in each tree represent increasingly detailed domain names (e.g., domain names with more levels (1003-1007)). Additional child nodes may be added to the lowest level domain name nodes that include one or more levels of URI (1008-1011). It is noted that not all domain name nodes will have URI child nodes (1007).

With the exception of TLD nodes, every node in the AIC lookup table preferably contains metadata providing the application and category associated with the node (as shown in brackets below the nodes in FIG. 5), along with information about which type of field is present. The metadata also indicates if the domain name or URI must be exactly matched or if it may be treated with an implied wildcard. The implied wild card is at the start of domain names, e.g. *.provider.com and is at the end of URIs, e.g. application1/subapp/*. In FIG. 5, implied wildcards are shown with an asterix prefix or suffix as appropriate. It is to be further appreciated that with regards to a URI search, the illustrated embodiment of FIG. 5 is to be understood to encompass at least the following URI examples: */subapp/*, */string1/*string2*, */string1/*string2*/String3/*.

The matching process in Step 911 preferably starts by searching for a tree that matches the TLD of the target domain name, e.g. ".com". If a match is found, the process then searches the children of the TLD node for a domain node that matches at more domain levels (e.g. "social.com"). If a matching child node is found, it is selected as the new starting point and the domain search process repeats until a node is selected that has no child domain nodes matching the target domain name.

Up until this point, URI nodes have not been included in the search. However, once the best matching domain node has been identified, the process in Step 911 searches the selected node's URI children (if they exist) for URIs that match the target URI provided by Step 905 (if available). In this phase of the search, the URI is matched element by element from left-to-right. The process repeats until there are no more matching child URI nodes.

If a domain node requires an exact match and the target domain name matches the node value, but has additional lower domain levels, i.e. the target is a sub-domain of the domain node value, then the search has failed. Similarly, if an exact URI match is required and the target URI has more elements than the value of the URI node, the search has failed.

For example, "sub.chat.social.com/video" would be matched to node 1005 in FIG. 5 because it has the best matching domain name, but the URI doesn't match any of the URI child nodes underneath. "business.org/spreadsheet" would match node 1007, but "subdivision.business.org" would not match any nodes because node 1004 requires an exact match. A domain name is not considered to be matched if only the TLD is matched to the root of a tree.

In an alternative embodiment, the search can be performed or repeated with the TLD wildcarded. The node metadata indicates whether the value of each domain node is allowed to have its TLD wildcarded.

If the selection process receives multiple domain names (e.g. from multiple SNI or Certificate entries), then the selection process is repeated and the result that matches the highest number of domain levels, followed by the highest number of URI elements, is selected.

If the ACI lookup fails to return a match, certain values of the HTTP response Content-Type header can be matched to generic applications. For example, a Content-Type of ".mp4" can be mapped to an application identity and category of "Video".

If the selection logic in Step 911 is unable to produce a result at all, then the process will move to Step 913 and terminate with no result; otherwise the results of the application identification and categorization are made available at Step 914.

It is to be appreciated that those skilled in the art will understand that when searching the IP cache, RIR and AIC lookup table, well known techniques search as self-balancing trees and hash tables can be used to search large numbers of entries in a highly efficient manner.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method for determining the identity of an Over-the Top (OTT) application or service being accessed over the Internet, comprising the steps:

receiving a connection request in a network monitoring device;

inspecting IP packets in the received connection request;

generating a 5-tuple consisting of: IP source and destination addresses; a layer 4 transport protocol (e.g. TCP or UDP), and a transport protocol source and destination ports contained in the received connection request wherein the generated 5-tuple is compapred with entries in a connection table to determine if the received connection request is a new or existing connection request, whereby if there is no existing entry, then a new entry is created matching the generated 5-tuple associated with the received connection request;

determining if one or more entries are present in the received connection request have an IP address that matches a known server IP address;

determining if the received connection request is a HTTP connection request;

determining if the received connection request is a HTTPS or QUIC connection request;

determining if a subject field in the received connection request is available if no determination is made as to whether if the received connection request is either a HTTP, HTTPS or QUIC connection request;

determining if a candidate domain name is available from IP cache created from one or more of the above steps if no determination is made as to whether the received connection request is either a HTTP, HTTPS or QUIC connection request and no subject field is available in the received connection request; and identifying and categorizing OTT applications associated with the received connection request if it is determined: the connection is either a HTTP, HTTPS or QUIC connection type; a subject field is available; or a candidate domain name is available utilizing a lookup table that is periodically updated with new OTT applications.

2. The computer implemented method of claim 1, wherein receiving a connection request includes determining if a transport layer protocol is TCP and the destination TCP port in the connection request matches known ports to carry HTTP, HTTPS or QUIC requests.

3. The computer implemented method of claim 1, further including extracting URI and HTTP header fields from the connection request if it is determines the connection request is HTTP connection request.

4. The computer implemented method of claim 1, further including detecting an SNI extension in a ClientHello handshake message if it is determined the received connection request is a HTTPS or QUIC connection request.

5. The computer implemented method of claim 4, further including extracting the SNI from the ClientHello handshake message.

6. The computer implemented method of claim 1 where determining if the subject field is available includes inspecting an "End Entity" X.509 format Server Certificate in the TLS handshake ServerHello message.

7. The computer implemented method as recited in claim 1 wherein if determined there is a domain name entry with a matching IP address for the received connection request, the IP address of the destination server of the received connection request is stored as a candidate domain name.

8. The computer implemented method as recited in claim 7 wherein if determined the destination IP address associated with the received connection request cannot be directly mapped to a known domain name then, the destination IP address is compared with a list of IP address ranges registered as public IP addresses.

9. The computer implemented method as recited in claim 8 wherein the Public IP address ranges are managed and allocated by an International Regional Internet Registry (RIR) whereby each RIR publishes a database listing associated with unique IP addresses ranges on the public internet.

10. The computer implemented method as recited in claim 1, further including inspecting Domain Name System (DNS) queries between browsers and their designated DNS servers.

11. The computer implemented method as recited in claim 10 wherein a Host field in the received connection request is an IP address.

12. The computer implemented method as recited in claim 10 wherein a Host field in the received connection request is a domain name.

13. The computer implemented method as recited in claim 10 further including performing a DNS name-resolution query to obtain an IP address for a target HTTP/HTTPS server whereby a DNS server provides a response containing a domain name being queried and one or more IP addresses associated with the queried domain name.

14. The computer implemented method as recited in claim 13 wherein visible DNS name-resolution responses are inspected and utilized to add IP address/domain name mapping pairs to the IP cache.

15. The computer implemented method as recited in claim 14 wherein TLS handshake SNI entries are utilized to update the IP cache.

16. The computer implemented method as recited in claim 1 when if determined an application is being provided via an HTTP connection request, then one or more of the HTTP Host, Referrer, URI and Content-Type fields is extracted from the HTTP packet header to identify the application.

17. The computer implemented method as recited in claim 4 wherein if determined an application is being provided via an HTTPS or QUIC connection request, then the Service Name Identifier (SNI) field in the TLS handshake is utilized as a proxy for the HTTP Host field.

18. The computer implemented method and system as recited in claim 17 wherein:
if the SNI field is present, a corresponding IP address/domain name mapping pair is added to the IP cache;
if the SNI field is not populated in the TLS handshake then the "Subject" or "Subject Alternate Name" fields in the TLS server certificate are inspected;
if determined the destination IP address of a network connection cannot be directly mapped to a domain name than the destination IP address is compared with a list of IP address ranges registered as public IP addresses; and
if the SNI field is not populated in a TLS handshake than the "Subject" or "Subject Alternate Name" fields in the TLS server certificate are inspected.

* * * * *